Jan. 23, 1945.  E. F. RIESING  2,367,832
BUSHING
Original Filed Dec. 27, 1940

Inventor
ELLWOOD F. RIESING

By Ely & Frye
Attorneys

Patented Jan. 23, 1945

2,367,832

UNITED STATES PATENT OFFICE 2,367,832

BUSHING

Ellwood F. Riesing, Pontiac, Mich., assignor to The Firestone Tire & Rubber Company, Akron, Ohio, a corporation of Ohio Original application December 27, 1940, Serial No. 371,904, now Patent No. 2,308,965, January 19, 1943. Divided and this application November 26, 1942, Serial No. 467,024

2 Claims. (Cl. 308—26)

This invention relates to bushings and bushing assemblies, especially to bushings functioning as insulators connecting two movable parts without transmitting vibrations from one part to the other.

This application is a division of my copending application Serial No. 371,904, filed December 27, 1940, now matured into Patent No. 2,308,965 issued January 19, 1943.

One example of accessories of the above type is that between a gear shift shaft and an arm connecting to the transmission. In such cases, a bushing has been used which comprises inner and outer metal sleeves with a rubber body extending between and being vulcanized to both the inner and outer sleeves. These bushings are objectionable in that they must be made to an exact size in order to fit in the apparatus properly and such bushings are rather expensive, especially with relation to the bushings of the present invention.

A general object of the present invention is to provide an improved, inexpensive, easily manufactured rubber bushing adapted to prevent transmission of vibration between the metal parts which it connects, while also enabling one part to move with relation to the second part.

Another object of the invention is to provide a rubber bushing especially adapted to connect a shaft to an associated member.

The foregoing and other objects will appear as the description proceeds.

The invention is described with particular reference to the accompanying drawing of which:

Figure 1:
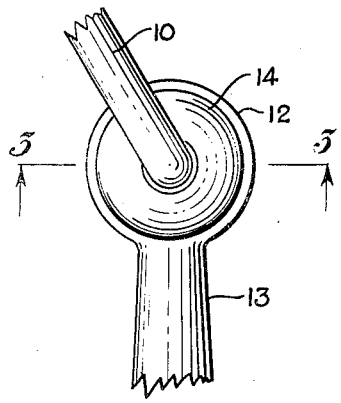
Figure 1 is a plan of a bushing assembly embodying the invention.
Figure 2:
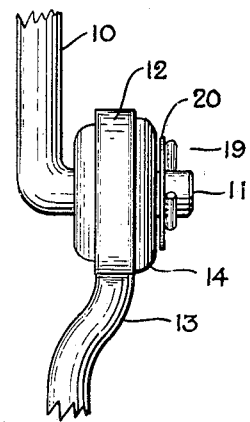
Figure 2 is a side elevation of the assembly of Figure 1.
Figure 3:
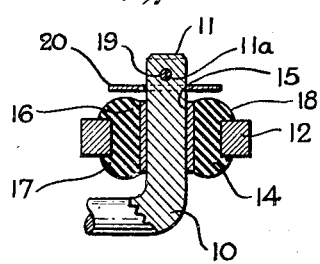
Figure 3 is an inverted vertical section on line 3—3 of Figure 1.
Figure 4:
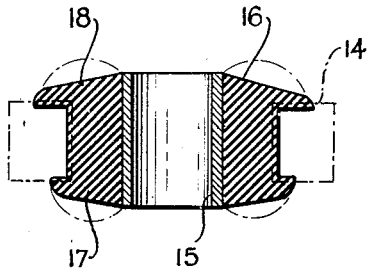
Figure 4 is an enlarged section through an uncompressed rubber bushing of the invention with the compressed position of the bushing being indicated in dotted lines.

Referring specifically to the accompanying drawing, a metal rod 10 having an end portion 11 extending at right angles therefrom is shown. The end portion 11 is to be connected to an eyelet, or eye, 12 formed at the end of a second metal arm 13 which may extend in substantially the same direction as the arm 10.

The end portion 11 of the arm 10 is connected to the eyelet 12 through the agency of a bushing 14 which comprises a metal sleeve 15 to which is vulcanized an annular rubber body 16. The sides of the rubber body 16 taper axially inwardly as they extend radially outwardly from the sleeve 15. Annular flanges 17 and 18 are formed at the edges of the rubber body 16 with the flange 18 being substantially thicker and extending farther from the rubber body 16 than the flange 17. The flanges 17 and 18 are adapted to engage with the sides of the eye 12 and retain the bushing 14 in position. The diameter of the rubber body 16 is made slightly larger than the inner diameter of the eye 12, while the distance between the confronting faces of the flanges 17 and 18 is less than the thickness of the eye. Hence the rubber bushing must be compressed radially and expanded axially to be positioned between the end 11 of arm 10 and the eye 12. Such compression and tension set up in the rubber body 16 materially aids the rubber bushing in retaining itself in engagement with the eye. Initial engagement of the bushing 14 and eye may be facilitated by forming the flange 17 smaller than the flange 18 which expedites forcing the bushing into engagement with the eye. The rubber bushing may be soaped to aid in slipping it into position.

The metal sleeve 15 is adapted to slide over the end of the arm 11, and to be retained in engagement therewith by a cotter pin 19 that extends through a hole 11a in the end of the arm. A washer 20 may be positioned between the sleeve and the cotter pin, as shown, to aid in positioning the bushing.

It should be noted that the bushings of the invention are adapted to be used to connect rods or other elements having very light loads applied thereto. That is, the bushing constructions are to be used in transmitting forces in the nature of one-half to one and one-half pounds.

From the foregoing it will be seen that a simple, easily constructed, inexpensive rubber bushing is provided by the invention. This bushing does not have to be made to an exact size, with the result that it is easy to manufacture. The use of but one metal sleeve in the bushing is a feature of the invention.

While but one embodiment of the invention has been illustrated and described it will be appreciated that modifications thereof may be made without departing from the scope of the invention, as defined in the appended claims.

What is claimed is:

1. A bushing assembly comprising a rod having an end portion extending at right angles to the part of the rod immediately thereadjacent, an arm having an eyelet formed at the end thereof, a metal sleeve engaged with the end of said rod, said sleeve extending through said eyelet, a rubber bushing vulcanized to said sleeve, said rubber bushing having spaced radially outwardly extending flanges at the edges thereof, said flanges defining an annular groove therebetween, said eyelet interposed in said groove, the width of said groove being less than the width of said eyelet and the diameter of said bushing at the base of said groove being greater than the inside diameter of said eyelet, one of said flanges being radially shorter than the other, whereby the assembly of the eyelet and the bushing is facilitated and whereby said bushing is compressed radially within said eyelet and stretched laterally at the edges thereof.

2. In combination, two load arms connected and retained in spaced relation by a rubber bushing, said bushing being vulcanized to a rigid sleeve which sleeve is carried on one of said arms, said bushing having spaced radially outwardly extending annular flanges, one of said flanges being radially longer than the other, the other of said arms having an eyelet formed on one of its extremities, said bushing being interpositioned in said eyelet, the body portion of said bushing being radially compressed and the said flange portions axially expanded by said eyelet, whereby vibrations from one arm to the other are dampened and one arm is permitted to move with relation to the other arm.

ELLWOOD F. RIESING.